Sept. 29, 1925.
A. M. BRENNE
1,555,628
FRICTION SHOCK ABSORBING MECHANISM
Filed Nov. 2, 1922
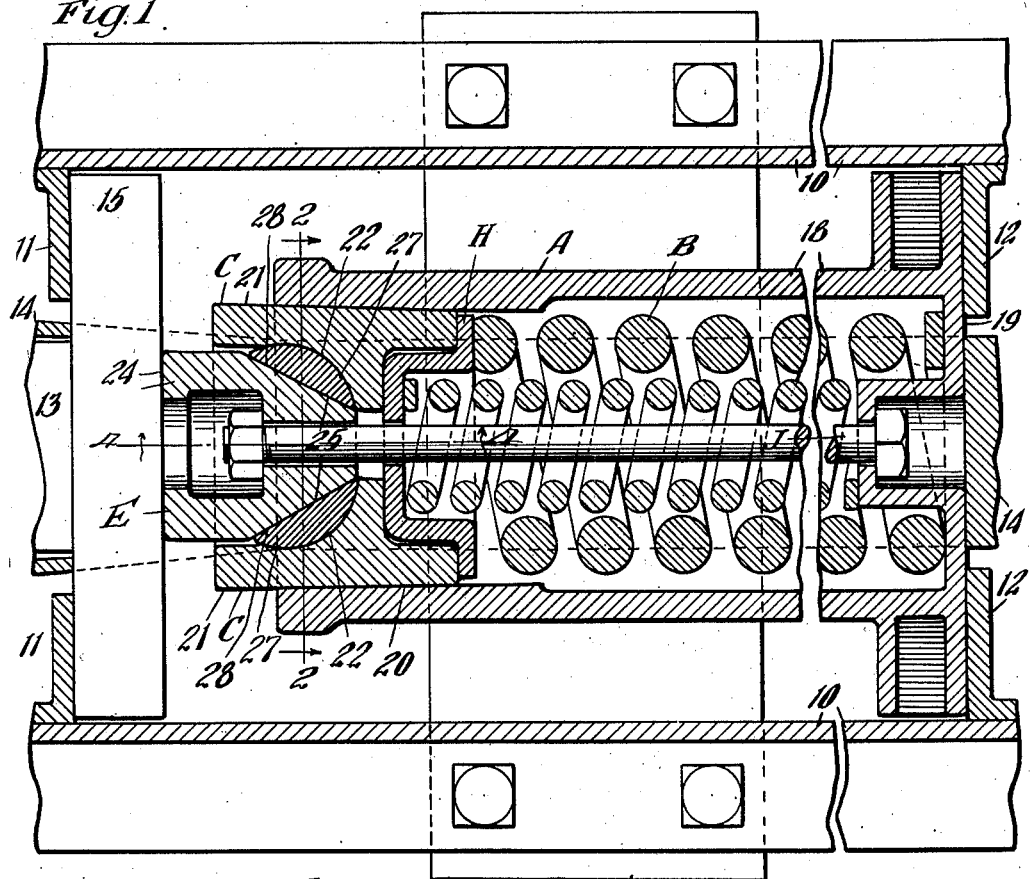
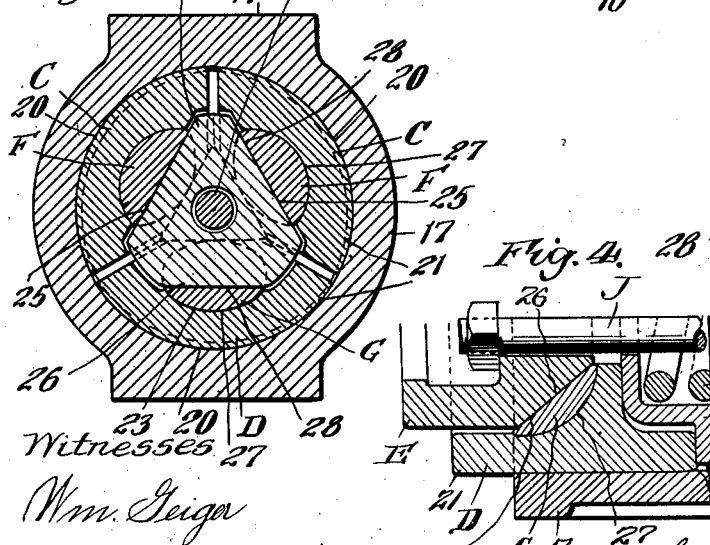
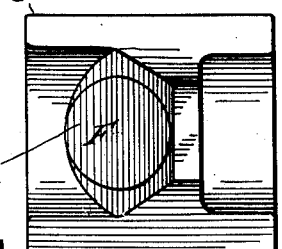
Witnesses
Wm. Geiger
Inventor
Arild M. Brenne
By George I. Haight his Atty Patented Sept. 29, 1925.

1,555,628

UNITED STATES PATENT OFFICE.

ARILD M. BRENNE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 2, 1922. Serial No. 598,519.

*To all whom it may concern:*

Be it known that I, ARILD M. BRENNE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism of that type characterized by a wedging means having keen angle effect in compression and blunt angle effect in release and wherein means are employed to insure the proper contact of all co-acting wedge faces.

A specific object of the invention is to provide a mechanism of the character indicated in the preceding paragraph wherein a cylindrical shell is employed with a circularly arranged series of shoes and a wedge cooperable therewith in combination with means between the wedge and shoes automatically insuring proper and effective action of the wedge during a compression stroke.

In the drawing forming a part of this specification, Figure 1 is a horizontal longitudinal sectional view of a portion of a railway draft rigging with the qualification that the section through the friction elements proper corresponds to the section made by two intersecting planes at 120° to each other. Figure 2 is a vertical transverse sectional view of the shock absorbing mechanism proper taken on the line 2—2 of Figure 1. Figure 3 is a plan view of one of the friction shoes. And Figure 4 is a broken vertical sectional view corresponding substantially to the line 4—4 of Figure 1.

In said drawing, 10—10 denote channel draft sills of a car underframe, to the inner faces of which are secured front stop lugs 11 and rear stop lugs 12. A portion of a draw-bar is indicated at 13 to which is operatively connected a hooded cast yoke 14 and within which is mounted the shock absorbing mechanism proper, hereinafter described, and a front follower 15. The yoke and parts therewithin are supported in operative position by a detachable saddle plate 16.

The friction shock absorbing mechanism proper, as shown, comprises a combined friction shell and spring cage casting A; a spring resistance B; two like friction shoes C—C and a third friction shoe D; a pressure-transmitting wedge E; two like wedge elements F—F; a third corresponding element G; a spring follower H; and a retainer bolt J.

The casting A is of cylindrical form having a friction shell section proper 17 formed at its outer end and, rearwardly thereof, a spring cage or casing 18. The casting A has a rear integral wall 19 cooperable with the rear stop lugs 12. The shell 17 is formed on the inner side thereof with inwardly slightly converged friction surfaces 20, the same preferably corresponding to portions of three cylindrical surfaces, as best shown in Figure 2.

The three friction shoes C and D are arranged in a circular series, each of said shoes having an outer cylindrical friction surface 21 cooperable with one of the corresponding cylindric shell surfaces. The two like shoes C are provided on their inner sides with concave depressions 22, each corresponding to a section of a sphere, the center line of which lies in a plane perpendicular to the opposed wedge face of the wedge E and passing through the longitudinal axis of the mechanism. The shoe D is similarly provided with a concave bearing 23, the center of which lies in a plane passing through the longitudinal axis of the mechanism perpendicular to the corresponding opposed face of the wedge E which, as hereinafter explained, extends at a different angle to the axis of the mechanism than those faces of the wedge which are opposite the shoes C.

The spring follower H is of cup-shape, having bearing on the inner ends of the shoes C and D and also on the inwardly extended projections thereof, which are provided for the said bearings 22 and 23. The spring B is interposed between said follower H and the rear wall of the casting A.

The wedge E is in the form of a preferably cast block having an outer flat transverse face 24 bearing upon the follower 15. At its inner end, the wedge E is provided with two wedge faces 25—25 and a third face 26, all converged toward the inner end of the shell. Said three faces 25 and 26 are arranged at 60° to each other, the two faces 25—25 extending at a relatively acute angle with respect to the axis of the mechanism. The other face 26 extends at a relatively blunt and true releasing angle with respect to the axis of the mechanism.

The three elements F and G are of similar character, each being provided on its outer side with a convex or spherical bearing face 27 and on its inner side with a flat face 28. As will be understood, the two elements F have their spherical outer faces and inner wedge faces 27 made to correspond with the two shoes C and the wedge faces 25 of the block E and the other element G is made to cooperate with the bearing face 23 of the shoe D and the inclined blunt angle face 26 of the wedge block E.

The retainer bolt J is anchored at its rear end within a hollow boss formed on the casting A and at its forward end within a suitable recess in the wedge E, the latter and the follower H being suitably apertured to accommodate the shank of the bolt.

The operation of the mechanism, assuming a compression stroke under buff, is as follows. As the wedge E is forced inwardly of the shell, the true wedging or spreading action is set up on the two wedge faces 25 cooperating with the two wedge elements F and through the latter with the shoes C, it being understood that there will be an equal reaction from the opposed shoe D acting through the element G. The capacity produced will therefore be in accordance with the acuteness of the angle of the wedge faces 25. In release, upon discontinuance of the actuating force, the wedge E will readily disengage itself from the element G on account of the blunt releasing angle of the cooperating faces 26 and 28, thus permitting collapse of the friction unit and allowing all of the parts to be projected outwardly to their normal full release position.

With my arrangement, the three elements F and G will automatically provide for any necessary adjustment between the wedge E and the three shoes to compensate for any variations which may occur in either the angle between any two faces of the wedge considered in cross section as shown in Figure 2 or in the angle which any one of said faces may make with respect to the axis of the mechanism. This insures true and full surface contact between the faces of the wedge E and the elements F and G and also will take care of any tilting or skewing of the wedge E which may occur by reason of an eccentric blow being delivered to the mechanism. Furthermore, the slight differential action which occurs by reason of the taper of the shell will be compensated for by adjustment of the elements F and G with respect to their corresponding bearing surfaces on the wedge E. By employing three distinct sections of cylindrical surfaces on the interior of the shell, full surface contact between the shoes and shell, in all relative positions thereof, will be maintained.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having interior friction surfaces; of a spring resistance; a plurality of friction elements cooperable with said shell; a pressure-transmitting element extending between said friction elements; and means, interposed between said friction elements and the pressure-transmitting element, said means having wedge face engagement with one of said elements and adjustable spherical bearing face engagement with an opposed element.

2. In a friction shock absorbing mechanism, the combination with a friction shell having interior friction surfaces; of a spring resistance; a plurality of friction elements cooperable with said shell; a pressure-transmitting element extending between said friction elements; and a plurality of members interposed between said pressure-transmitting element and said friction elements, one member cooperating with each friction element, each of said members having a ball face on one side and a flat face on the other side inclined with respect to the axis of the mechanism, the elements being provided with cooperating faces for said members.

3. In a friction shock absorbing mechanism, the combination with a friction shell having interior friction surfaces; of a spring resistance; a plurality of friction shoes cooperable with said shell; a pressure-transmitting element extending between said friction shoes; and a plurality of members interposed between said pressure-transmitting element and said friction shoes, each of said members having a ball face cooperable with a correspondingly curved face on the shoe and an inner flat face cooperable with a corresponding flat face on the pressure-transmitting element, all of said flat bearing faces extending at an angle to the axis of the shell and toward the inner end thereof.

4. In a friction shock absorbing mechanism, the combination with a friction shell having interior friction surfaces; of a spring resistance; a plurality of friction shoes cooperable with said shell; a pressure-transmitting element extending between said friction shoes; and a plurality of members interposed between said pressure-transmitting element and each of said friction shoes, each of said members having a ball face cooperable with a correspondingly curved face on the shoe and an inner flat face cooperable with a corresponding flat face on the pressure-transmitting element, all of said flat bearing faces extending at an angle to the axis of the shell and toward the inner end thereof, the angle of inclination of some of said faces differing from the angle of others.

5. In a friction shock absorbing mechanism, the combination with a friction shell; of a spring resistance; a plurality of friction shoes cooperable with the interior of said shell; a pressure-transmitting wedge having faces on the inner end thereof converged inwardly of the shell; and a compensating element interposed between each of said faces of the wedge and a friction shoe, each of said elements having an outer spherical bearing face cooperable with a corresponding curved bearing face on the shoe.

6. In a friction shock absorbing mechanism, the combination with a cylindrical friction shell; of a spring resistance; a circularly arranged series of three friction shoes cooperable with the shell; a centrally disposed pressure-transmitting wedge having three faces on the inner end thereof converged inwardly of the shell; and compensating elements interposed between said faces of the wedge and each of the shoes, each of said elements having a flat face engaging with a face of the wedge and an outer convex bearing face cooperable with a corresponding concave face on the shoe.

7. In a friction shock absorbing mechanism, the combination with a cylindrical friction shell; of a spring resistance; a circularly arranged series of friction shoes cooperable with the shell, each of said shoes having a concave bearing surface on its inner side; a centrally disposed pressure-transmitting wedge having, at its inner end, two wedge faces inclined at a relatively acute angle with respect to the axis of the shell and a third face inclined at a relatively blunt angle with respect to said axis; and a compensating element interposed between each shoe and a corresponding opposed face of the wedge, each of said elements having an outer convex surface and an inner flat surface.

8. In a friction shock absorbing mechanism, the combination with a friction shell; of a spring resistance; a series of friction shoes cooperable with the shell and arranged symmetrically around the axis thereof; a centrally disposed pressure-transmitting member, said member and each shoe having an opposed set of faces, each set comprising a flat face and a concave face curved longitudinally of the mechanism and with all of said sets converged inwardly of the shell; and an adjusting member interposed between and cooperating with each set of said faces only.

9. In a friction shock absorbing mechanism, the combination with a cylindric friction shell; of a series of three friction shoes cooperable with the shell and arranged circularly; a spring resistance; a pressure-transmitting member having three flat faces all converged inwardly of the shell and disposed around the axis thereof, at least one of said faces extending at an angle different from any other with respect to said axis; and means interposed between each of said faces and the corresponding friction shoe.

10. In a friction shock absorbing mechanism, the combination with a friction shell having interior cylindric friction surfaces; of a spring resistance; three friction shoes arranged in a circular series and cooperable with said shell; a pressure-transmitting member having two faces thereof inclined inwardly of the shell toward the axis thereof at an acute wedging angle, said member having also a third face inclined toward the axis and inner end of the shell but at a relatively blunt angle with respect to the axis; and pressure-transmitting means interposed between each of said faces and the corresponding friction shoe.

In witness that I claim the foregoing I have hereunto subscribed my name this 6th day of October, 1922.

ARILD M. BRENNE.